Dec. 13, 1966     T. H. TROLLER     3,291,381

HIGH ENERGY AXIAL FLOW APPARATUS

Filed April 15, 1966

INVENTOR.
THEODOR H. TROLLER

BY *E. Wallace Biesecker* his ATTORNEY

United States Patent Office 3,291,381
Patented Dec. 13, 1966

3,291,381
HIGH ENERGY AXIAL FLOW APPARATUS
Theodor H. Troller, Ava Ranch, Portal, Ariz.
Filed Apr. 15, 1966, Ser. No. 542,804
13 Claims. (Cl. 230—120)

This application is a continuation-in-part of my abandoned application, Serial No. 254,082, filed January 28, 1963, and my abandoned application, Serial No. 310,937, filed September 23 1963, and my copending application Serial No. 517,502, filed December 13, 1965.

This invention relates to an axial flow apparatus for adding energy to a flowing fluid which apparatus would be commonly called a compressor, blower, or pump, and particularly to such apparatus having an impeller with blades capable of adding a large magnitude of energy to a fluid. More specifically the impeller of this invention carries blades having an impulse configuration at their hub portions and a reaction configuration at their tip portions.

The blades of compressors, blowers or pumps deliver energy to a fluid by exerting pressure on the fluid in a certain relation to the relative movement between the blades and the fluid. This distribution of energy transfer is dependent on the shape and arrangement designed into the blades. The amount of energy that can be transferred to the fluid is to a large extent dependent on the velocity of the blades as well as on their size and shape. Axial flow impellers of such apparatus either use impulse blading or reaction blading for accomplishing this energy transfer. The selection of the different type blading is made on the basis, generally, of a particular application, keeping in mind the inherent limitations displayed by the type of blading. As is well known reaction blading manifest a static pressure increase in the fluid across each blade for the addition of energy to the fluid stream. However, the reaction type blading is inherently limited by the possibility of flow separation of the fluid from a blade as the fluid moves along such blade in the direction of an increased static pressure. Impulse blading, on the other hand, avoids the flow separation problem of the reaction blades, since its imparts energy to moving fluids mainly by increasing the velocity of the fluid across the blades, while realizing little or essentially no changes in static pressure of the fluid. However, impulse blading, although capable of large energy transfer, is limited by the fact that the length of such blading is restricted. The length of impulse blading is limited to a relatively narrow range of ratios of its outer diameter to its inner diameter. Thus, simply stating, reaction blading can only add a certain maximum amount of energy to a fluid stream depending on its configuration, while impulse blading can only add a certain amount of energy to a fluid stream depending on its maximum permissible length. Many futile attempts have been made to overcome the above blading problems in an effort to increase the energy transfer capabilities of axial flow compressors, blowers or pumps.

I have successfully overcome a problem of increasing the energy transfer capability of axial flow compressors, blowers or pumps by providing an impeller having blading which combines impulse and reaction configuration. More specifically I provide this increased energy transfer capability by making each blade an impulse configuration from the hub to radial length sufficient to handle an effective or substantial quantity of fluid, and making the outer expanse of the blade a reaction configuration.

This invention was arrived at solely by my independent investigations since none of the axial flow compressor, blower or pump are revealed or suggested this approach to increasing energy transfer. After completing my present invention it was suggested that the turbine art offers solutions to the problems which I overcome. This is not so as those well versed in the art understand. Turbine engineering may limit itself to the problem of high efficiency and will direct great efforts to achieve a small increase in efficiency, while essentially not encountering any difficulties in obtaining larger values of energy exchange between rotor and fluid. Turbine design, therefore, concentrates on efficiency problems and problems related thereto all of which are only one group of several design problems of concern to axial flow apparatus of the type to which the present invention relates. In the design of compressors, blowers and pumps of axial flow nature where energy is added to the fluid it is often essential to obtain a larger energy transfer at a given rotor speed, even at the cost of sacrificing a certain percentage of efficiency. Thus, a great distinction exists between the aerodynamic problems of axial flow compressors, blowers, and pumps and those of turbines, and, accordingly, the prior art teachings urged for turbines do not suggest the solution to problems of such axial flow energy adding apparatus.

Other advantages will become apparent upon the reading of the following specification taken together with the accompanying drawings, in which.

Figure 1:
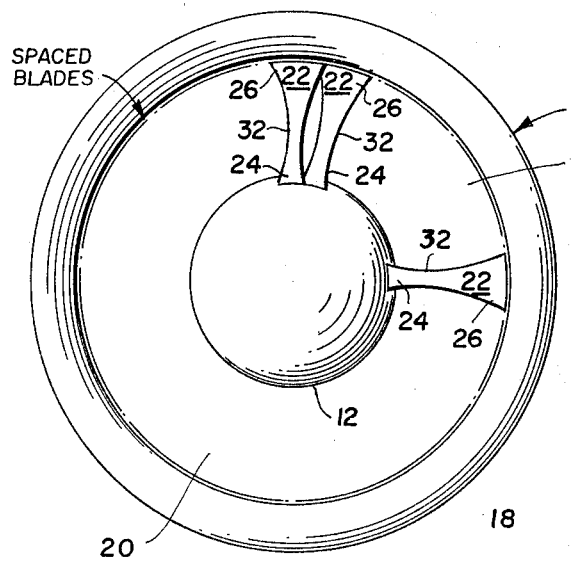
FIG. 1 is a front elevation view of an axial flow compressor, blower, or pump showing features thereof embodying the present invention.
Figure 2:
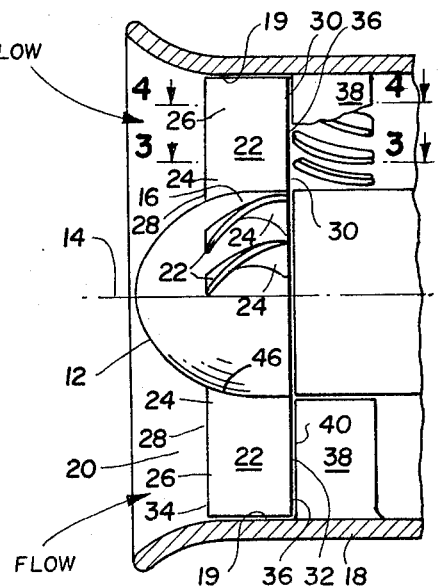
FIG. 2 is a side elevation view of an axial flow compressor, blower, or pump, partly in section and partly broken away, showing a further details of construction of the present invention.

Referring now to the drawings wherein like reference numerals refer to like parts throughout the various figures, 10 refers generally to an axial flow apparatus for adding energy to a moving fluid, commonly known as either a compressor, blower, or pump, and hereinafter referred to as blower 10 for sake of clarity in description. As shown in FIGS. 1 and 2 the blower 10 is provided with an elongated, generally cylindrical rotor 12 rotatable about a central axis of rotation 14 extending longitudinally therethrough. The rotor 12 has an outer surface or hub portion 16 disposed at a prescribed radial distance from the axis of rotation 14. An elongated hollow housing 18 is oriented coaxially with the rotor 12 and forms a flow area or passageway 20 between the inner wall 19 of the housing 18 and the hub 16 of the rotor 12. The rotor 12 is driven about the axis of rotation 14 by motor or the like, not shown but arranged with respect to rotor 12 in any manner well known in this art.

A plurality of angularly spaced blades 22 is carried by rotor 12. The blades 22 are rigidly fixed with respect to the rotor 12 and extend radially outwardly from a circumferential region of the outer surface or hub 16 of rotor 12 to areas closely inwardly adjacent the inner wall portion 19 of the housing 18. The radial length of each blade 22 from the outer surface or hub 16 (hereinafter referred to as hub 16) to adjacent the inner wall portion 19 will be identified hereinafter as the effective or total length of each blade 22. Each blade 22 has an inner or root portion 24 extending a certain minimum distance of the total length of blade 22, and such root portion 24 extends radially outwardly from the hub 16. Each blade 22 is also provided with an outer or tip portion 26 extending a tangible distance of the total length of blade 22, and extends radially downwardly from the outermost portion or tip of the blade 22 adjacent the inner wall portion 19. The respective radial distances of the root portions 24 and tip portions 26 will be described more fully hereinafter.

Figure 3:
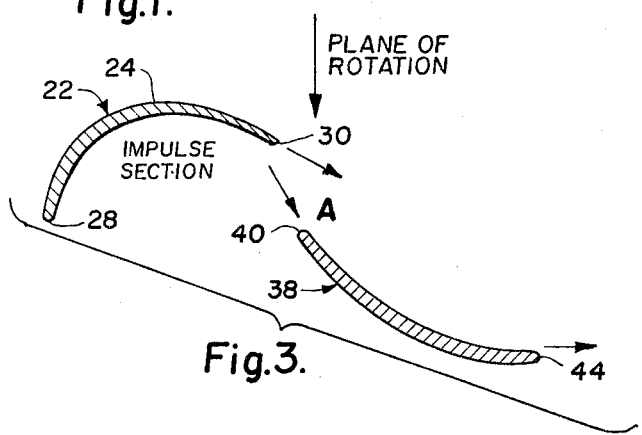
FIG. 3 is a sectional view taken along the line 3—3 of FIG. 2 and shows the impulse configuration of a blade of the present invention.

The root portion 24 of each blade 22 is provided with a blading section of impulse flow configurations, as shown in FIG. 3. Impulse configuration as is well known and as shown in FIG. 3 reflects a crescent-like shape. The radial length of this impulse blading section (root portion 24) should be of such magnitude that an effective or sufficient amount or quantity of fluid flow is acted upon by such blades. This effective quantity of fluid flow should be more than just a marginal boundary layer quantity, and of a magnitude such as to contribute a measurable or significant amount of energy to the total fluid flow. While this amount will depend on the various combinations of design features of the total apparatus, it should be of such magnitude that a stream assumed to come independently from this impulse section would persist by itself and entrain an appreciable amount of fluid on its outside before being diluted. On the basis of a boundary of such an imaginary separate impulse section in the fluid flow being inclined against the main streamline in a ratio of about 1.0 to 10.0 the effective radial length from the hub 16 surface out should then be at least approximately 10% of the total length of the blades 22.

Impulse blading with its advantages of large energy transfer into the fluid has an inherent limitation if one wishes to add to all parts of the fluid passing across the impulse blading an equal amount of energy or at least an amount of the same order of magnitude. A basic fact of energy exchange in rotating fluid apparatus is the classic Eulerian rule that this energy exchange is proportional to the product of rotational speed of the acting apparatus section times the change of rotational velocity in the corresponding fluid part resulting from the rotor action. Also, for constant energy addition it follows that for a given rotor this induced velocity change is inversely proportional to the radius. Assuming that one wishes to accomplish constant static pressure but not a pressure drop at the hub one is limited to an induced rotational velocity to two times the hub rotational speed for the case of constant axial velocity from leading edge to trailing edge of an impulse blade. It is evident then that at a radial length of impulse blade of about 33⅓% of the rotor radius at the region where an impulse blade is carried thereby, the induced rotational speed is just equal to the rotor rotational speed, making the resultant fluid velocity relative to the rotor significantly smaller at the trailing edge against the relative velocity existing at the leading edge to insure large static pressure increase in the rotor action and thereby eliminating the possibility of creating a predominately impulse action. While this condition may be modified by divergence of the hub 16 surface and resultant axial velocity increase between the leading edges and trailing edges of the impulse blades, and by other factors, the figure for impulse blade length (i.e. root portion 24), of about 33⅓% of the rotor radius at the region where such impulse blade is carried may serve as an illustrative indication for the maximum limitation of radial length of impulse blading.

Thus, as illustrated above the indication of an effective length of impulse blade section (i.e. root portion 24) may be expressed in terms of total length of blade 22 or in terms of the radius of the rotor 12 at the region where a blade 22 is carried. I have found that depending on particular circumstances of flow quantities, stator vane arrangements, and other design features the minimum radial length of impulse blade section (root portion 24) should be no less than about 10% of either the total length of blade 22 or rotor 12 radius at the region where a blade 22 is carried. Whichever value is smaller will still constitute an effective and essential utilization of impulse action by the root portion 24 with respect to the blower 10 as a whole.

The root portion 24 of each blade 22, hereinafter referred to as impulse section 24 for clarity of description, is provided with a leading edge 28 pointed generally at an angle in the direction of rotation of the rotor 12 as shown in FIG. 3. Each impulse section 24 is also provided with a trailing edge portion 30 directed at an angle of no less than approximately 15° with respect to a plane through the rotor axis 14, and into the direction of rotation. The reason for this 15° limitation is, as is well known in this art, that in order for impulse blading to operate effectively as energy adding blading, the trailing edge portions thereof must be directed forwardly in the direction of rotor rotation at an angle of not less than about 15°.

Figure 4:
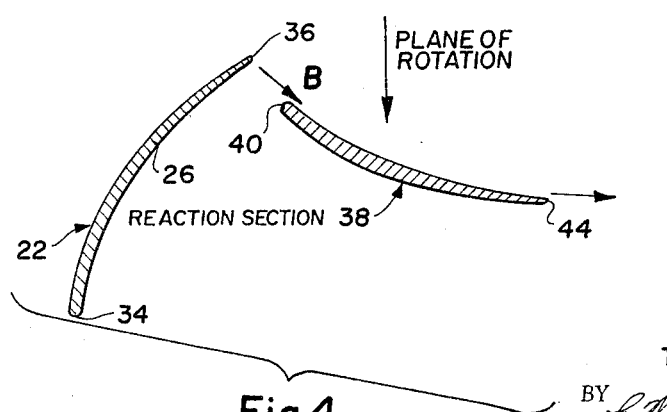
FIG. 4 is a sectional view taken along the line 4—4 of FIG. 2 and shows the reaction configuration of a blade of the present invention.

The tip portion 26 of each blade 22 comprise a reaction configuration extending radially downwardly from the tip or outermost reach of blade 22 and includes a small transition section 32 closely adjacent the outer radial section of impulse section 24 and which transition section aerodynamically rapidly, smoothly and continuously connects with the impulse section 24. The tip portion 26 will be hereinafter referred to as reaction section 26 for sake of clarity of description. The reaction section 26 of each blade, as shown in FIG. 4, is essentially similar to an air-foil section as used in air craft wings, and is provided with a leading edge portion 34 disposed at an acute angle to the plane of rotation of the rotor 12 and pointed in the direction of rotation. The reaction section 26 is also provided with a trailing edge 36 directed generally backwardly and away from the direction of rotation at an angle to the plane of rotation. Since reaction blading is not limited to an effective length as is impulse type blading, the length of the reaction section 27 is not critical and can be made to conform to a magnitude dictated by a specific application. I have found, however, that the practical minimum limit of the radial length of the reaction section 26 of each blade 22 should be no less than about 10% of the radius of rotor 12 at the region where blade 22 is carried or 10% of the total length of each blade 22.

Stator vanes 38 are provided upstream from and adjacent to the blades 22 as shown in FIGS. 2, 3 and 4. The main flow direction from each impulse section 24 is generally indicated by arrow A in FIG. 3 of the drawings, this direction corresponding to the direction of a leading edge portion 40 of a complemental stator vane 38. The stator vane 38, projects radially inwardly from the housing 18 as shown in FIG. 2, and is shaped in a configuration compatible with the complemental configuration of blade 22.

As shown in FIG. 4 the stator vane 38 has a leading edge portion 42 substantially parallel to the flow from the reaction section 26 as indicated by the arrow B. The trailing edge portion 44 of the stator vane 38 is shown directed axially at substantially right angles to the plane of rotation.

It will be noted that the impulse section 24 of the blades 22 adjacent to the hub 16 act on the fluid in such a way as to add large amounts of energy to the fluid without substantially changing the static pressure existing in the fluid and the reaction portion 26 of the blades 22 impart energy to the fluid per weight of fluid of the same order of magnitude as that imparted by the impulse section 24 near the hub 16, and this energy may appear in large part as a static pressure difference between the area immediately upstream of the blades 22 and the area immediately downstream of the blades 22.

The action of the impulse section and the addition of energy realized thereby can be essentially augmented by means of a diametrically diverging rotor hub as shown in FIG. 2 and represented by 46. This divergence at 46, as illustrated provides a substantial narrowing of the flow area across the impulse sections 24 of the blading 22 from the leading edges to the trailing edges thereof and is cooperable with the energy building characteristics of the impulse blading structures near the hub 16. However, it should be understood that such a hub divergence 46 is not necessary for the present invention.

The passageway 20 between the hub 16 of rotor 12 and inner wall 19 of housing can be readily adapted to meet a given requirement by varying the dimensions of the rotor 12 and housing 18. Although the rotor 12 and housing 18 are represented as elongated a considerable amount, the present invention is not so limited, a much shorter rotor 12 and housing 18 could be readily used.

Although the blades 22 are illustrated as being rigidly fixed to the hub 16 of rotor 12, the blades 22 can be readily arranged with respect to the rotor 12 in any manner, such as by pivoting for pitch adjustment, for example. Furthermore, the blades 22 do not have to be uniformly, angularly spaced as illustrated, since particular applications might require non-uniform spacing of blades 22 which could be used without departing from the scope of the present invention.

Even though the rotor 12 is illustrated as an unitary body it should be understood that the present invention is not limited to such as unitary configuration.

Although, as illustrated, the stator vanes 38 are provided only downstream and adjacent the blades 22, it should be understood that stator vanes 38 could be used both upstream and/or downstream of blades 22. Counter-rotating blade arrangements can also be used in connection with and as part of the rotor of the present invention in any of the well known suitable manners. Other stator vane 38 arrangements solely or together with counter-rotating rotors can be used without varying the scope of the present invention.

Having described preferred embodiments of the present invention in accordance with the patent statutes, it is to be realized that modifications may be made without departing from the broad scope of the invention. Accordingly, it is respectfully requested that the scope of this invention not be restricted to the specific forms shown or uses mentioned except to the extent indicated in the appended claims.

What is claimed:

1. An axial flow apparatus for adding energy to a flowing fluid comprising: a rotor member; a hollow housing member encompassing said rotor member and laterally spaced therefrom to define a fluid flow passageway therebetween; a plurality of blades carried by said rotor member, each of said blades having a portion thereof extending radially through said passageway, each of said blades having inner and outer portions, each of said inner portions having an impulse blade shape and extending radially outwardly from said rotor member a distance of no less than 10% of a radius of said rotor member extending through the region of said rotor member where said blades are carried, each of said outer portions extending radially outwardly from the radial outer section of each of said inner portions to adjacent the inner surface of said housing member, and each of said outer portions having at least the radial outer expanse thereof of a reaction blade shape.

2. An axial flow apparatus as set forth in claim 1 wherein said radial outer expanse of each of said outer portions is of a reaction blade shape of a length of no less than 10% of a radius of said rotor member extending through the region of said rotor member where said blades are carried.

3. An axial flow apparatus as set forth in claim 1 wherein the radial length of each of said inner portions is no greater than 33⅓% of a radius of said rotor member extending through the region of said rotor member where said blades are carried.

4. An axial flow apparatus as set forth in claim 1 wherein each of said inner and outer portions has a leading and trailing edge, and said trailing edge of each of said inner portions is pointed at an angle of no less than 15° from a plane through the axis of rotation of said rotor member and in the direction of rotation of said rotor member.

5. An axial flow apparatus as set forth in claim 1 wherein said rotor member outer surface at the region where said blades are carried diverges with respect to the axis of rotation of said rotor member.

6. An axial flow apparatus as set forth in claim 2 wherein said housing member is elongated, said rotor member is elongated, each of said inner portions is of a crescent-like impulse blade shape, the radial length of each of said inner portions is no greater than 33⅓ of a radius of said rotor member extending through the region of said rotor member outer surface of said blades are carried, and each of said outer portions is of an airfoil-like reaction blade shape.

7. An axial flow apparatus as set forth in claim 6 wherein each of said inner and outer portions has leading and trailing edges, said trailing edge of each of said inner portions is pointed at an angle of no less than 15° from a plane through the axis of rotation of said rotor member and in the direction of rotation of said rotor member, and a plurality of stator vanes is carried by said housing and radially extends therefrom towards said rotor member.

8. An axial flow apparatus for adding energy to a flowing fluid comprising: a rotor member; a hollow housing member encompassing said rotor member and laterally spaced therefrom to define a fluid flow passageway therebetween; a plurality of blades carried by said rotor member, each of said blades having a portion thereof extending radially through said passageway, each of said blades having inner and outer portions, each of said inner portions having an impulse blade shape and extending radially outwardly from said rotor member a distance of no less than 10% of the total length of each of said portions extending radially through said passageway, each of said outer portions extending radially outwardly from a radial outer section of each of said inner portions to adjacent the inner surface of said housing member, and each of said outer portions having at least the radial outer expanse thereof of a reaction blade shape.

9. An axial flow apparatus as set forth in claim 8 wherein said radial outer expanse of each of said outer portions is of a reaction blade shape of a length of no less than 10% of the total length of each of said portions extending radially through said passageway.

10. An axial flow apparatus as set forth in claim 8 wherein each of said inner and outer portions has a leading and trailing edge, and said trailing edge of each of said inner portions is pointed at an angle of no less than 15° from a plane through the axis of rotation of said rotor member and in the direction of rotation of said rotor member.

11. An axial flow apparatus as set forth in claim 8 wherein said rotor member outer surface at the region where said blades are carried diverges with respect to the axis of rotation of said rotor member.

12. An axial flow apparatus as set forth in claim 9 wherein said housing member is elongated, said rotor member is elongated, each of said inner portions is of a crescent-like impulse blade shape, and each of said outer portions is of an air foil-like reaction blade shape.

13. An axial flow apparatus as set forth in claim 12 wherein each of said inner and outer portions has a leading and trailing edge, said trailing edge of each of said inner portions is pointed at an angle of no less than about 15° from a plane through the axis of rotation of said rotor member and in the direction of rotation of said rotor member, and a plurality of stator vanes is carried by said housing member and radially extends therefrom towards said rotor member.

References Cited by the Examiner

UNITED STATES PATENTS

| | | | |
|---|---|---|---|
| 2,378,372 | 6/1945 | Whittle | 230—134.2 |
| 2,505,755 | 5/1950 | Ganahl et al. | 230—130.2 |
| 2,552,118 | 5/1951 | Sawyer | 230—120 |
| 2,592,471 | 4/1952 | Sawyer | 230—120 |
| 2,660,401 | 11/1953 | Hull | 230—120 |
| 2,663,493 | 12/1953 | Keast | 230—134.2 |

MARK M. NEWMAN, *Primary Examiner.*

H. F. RADUAZO, *Assistant Examiner.*